(12) United States Patent
Futase

(10) Patent No.: US 10,839,501 B2
(45) Date of Patent: Nov. 17, 2020

(54) SYSTEM FOR CHECKING PACKAGE BODY WITH IMAGE

(71) Applicant: YUSHIN CO., LTD., Niigata (JP)

(72) Inventor: Katsunori Futase, Niigata (JP)

(73) Assignee: YUSHIN CO., LTD., Niigata (JP)

( * ) Notice: Subject to any disclaimer, the term of this patent is extended or adjusted under 35 U.S.C. 154(b) by 37 days.

(21) Appl. No.: 16/310,283

(22) PCT Filed: Feb. 14, 2018

(86) PCT No.: PCT/JP2018/004988
§ 371 (c)(1),
(2) Date: Dec. 14, 2018

(87) PCT Pub. No.: WO2018/128197
PCT Pub. Date: Jul. 12, 2018

(65) Prior Publication Data
US 2019/0259143 A1    Aug. 22, 2019

(30) Foreign Application Priority Data

Feb. 22, 2017 (JP) .................................. 2017-031176
Jun. 2, 2017 (JP) .................................. 2017-110039

(51) Int. Cl.
*G06K 9/00* (2006.01)
*G06T 7/00* (2017.01)
(Continued)

(52) U.S. Cl.
CPC ............ *G06T 7/0002* (2013.01); *B65B 57/02* (2013.01); *B65B 57/04* (2013.01); *G01N 21/90* (2013.01); *G06T 2207/30112* (2013.01)

(58) Field of Classification Search
CPC combination set(s) only.
See application file for complete search history.

(56) References Cited

U.S. PATENT DOCUMENTS

| 2006/0244598 | A1* | 11/2006 | Hyde | G06K 19/0723 340/572.1 |
| 2014/0282334 | A1* | 9/2014 | Hu | G01N 21/9501 716/112 |
| 2015/0264319 | A1* | 9/2015 | Wood | G01N 21/95 348/125 |

FOREIGN PATENT DOCUMENTS

| JP | 05-143612 | 6/1993 |
| JP | 08-301237 | 11/1996 |

(Continued)

OTHER PUBLICATIONS

International Search Report (ISR) from International Searching Authority (Japan Patent Office) in International Pat. Appl. No. PCT/JP2018/004988, dated May 15, 2018.

(Continued)

*Primary Examiner* — Alex Kok S Liew
(74) *Attorney, Agent, or Firm* — Greenblum & Bernstein, P.L.C.

(57) ABSTRACT

A system for checking a package body with an image is capable of automatically judging good or bad product of manufactured package bodies and automatically performing change of production conditions in a filling and packaging machine, and includes a filling and packaging machine, an image data judgement system, a storage device and an image data analysis system, wherein the image data judgement system is provided with an imaging device for shooting a package body, a storage unit for storing judgement condition on good or bad package body, a judgement unit for judging good or bad package body and an image data transmission unit for transmitting the image data shot by the imaging device to the storage device, and the image data analysis system is provided with an image data acquisition unit for acquiring image data and so on judged as a bad product in the judgement unit from the storage device.

2 Claims, 6 Drawing Sheets

(51) Int. Cl.
*B65B 57/02* (2006.01)
*B65B 57/04* (2006.01)
*G01N 21/90* (2006.01)

(56) References Cited

FOREIGN PATENT DOCUMENTS

| | | |
|---|---|---|
| JP | 10-142163 | 5/1998 |
| JP | 2000-088781 | 3/2000 |
| JP | 2001-097322 | 4/2001 |
| JP | 2006-248578 | 9/2006 |
| JP | 2006-292670 | 10/2006 |
| JP | 2009-156822 | 7/2009 |
| JP | 2012-197084 | 10/2012 |
| JP | 2016-047738 | 4/2016 |

OTHER PUBLICATIONS

Office Action issued in Japan Patent Appl. No. 2017-110039, dated Jul. 3, 2017, together with an English language transaltion.
International Preliminary Report on Patentability from International Searching Authority (Japan Patent Office) in International Pat. Appl. No. PCT/JP2018/004988, dated Sep. 6, 2019, together with an English language transaltion.
Office Action issued in Korea Patent Appl. No. 10-2018-7035076, dated Jul. 21, 2020.

\* cited by examiner

FIG.4 (a)
FIG.4 (b)
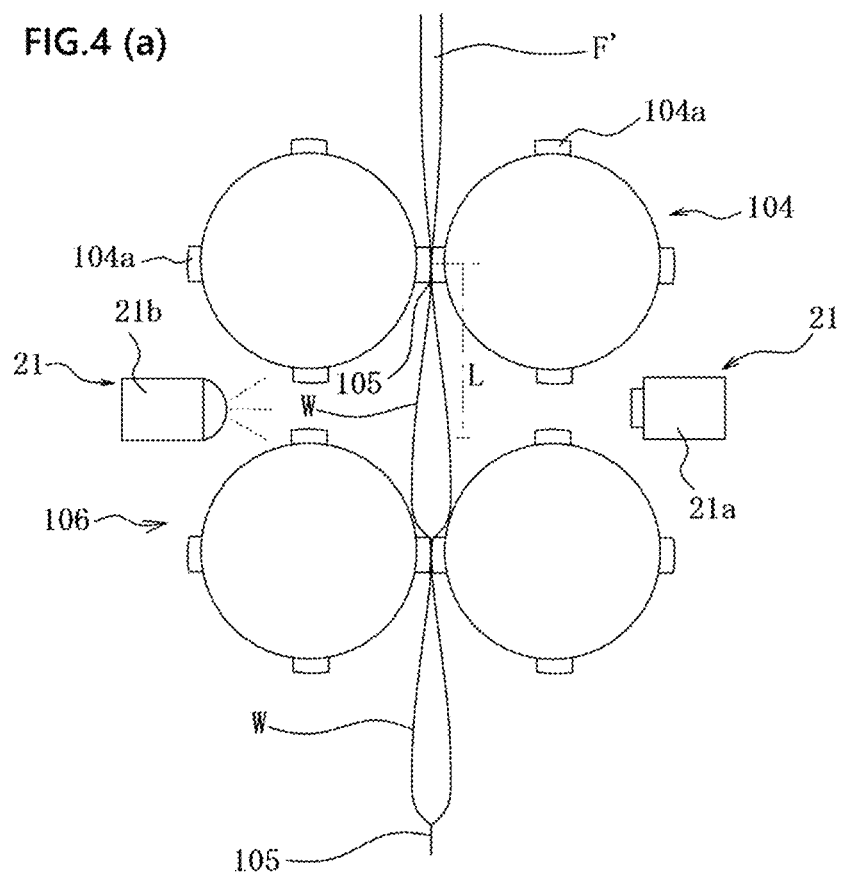
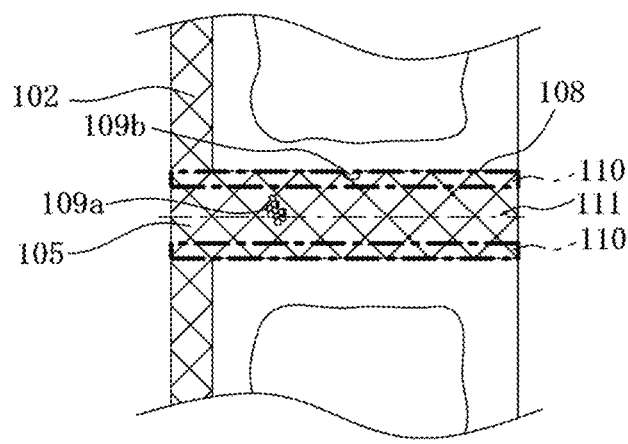

SYSTEM FOR CHECKING PACKAGE BODY WITH IMAGE

TECHNICAL FIELD

This invention relates to a system for checking a package body formed by filling and packing a liquid or viscous packaging material such as food and drink, seasonings, cosmetics, medicines or the like into a packaging bag made from a plastic film with an image.

RELATED ART

As a filling and packaging machine for automatically filling and packaging a liquid or viscous packaging material into a packaging bag made from a plastic film, an automatic filling machine as disclosed in Patent Document 1 and Patent Document 2 is known.

This automatic filling machine is constructed so as to continuously manufacture a packed body by center-folding an elongated packaging film made from a laminate film having a base film layer and a sealant layer in a widthwise direction so as to face the sealant layer to each other while continuously running in its longitudinal direction from top down, continuously heat-sealing both side edges of the folded film in a vertical direction to form a vertically sealed portion to thereby render the film into a cylindrical form, laterally heat-sealing a portion corresponding to a bottom side of the cylindrical packaging film along the widthwise direction of the packaging film to form a laterally sealed portion, filling the packaging material into the cylindrical packaging film and forming a laterally sealed portion at a place corresponding to a bag opening side of the film while pushing out the packaging material.

PRIOR ART DOCUMENTS

Patent Documents

Patent Document 1: JP-A-H08-301237
Patent Document 2: JP-A-2006-248578
Patent Document 3: JP-A-2016-47738

SUMMARY OF THE INVENTION

Task to be Solved by the Invention

The above automatic filling machine is provided with an operative panel comprising various switches and a touch panel. In the operative panel are set production conditions in accordance with a packaging form (production conditions such as setting of packaging film transportation rate, setting of seal pitch, setting of packaging material filling quantity, setting of operation timing thereof, setting of sealing pressure in vertical sealing mechanism and lateral sealing mechanism, setting of operation timing thereof and so on) by inputting the conditions every their items as numerical values.

In the setting of the automatic filling machine, however, it is necessary to perform detailed adjustment on experiential grounds. For example, if troubles such as defect of the sealed portion and the like are caused, the setting is not performed by a user himself and a worker is transferred from a maker of the automatic filling machine to the user to conduct change of the setting in the automatic filling machine (adjustment). Therefore, there is a problem that a time is taken for restarting the operation.

If the production conditions (settings) are not appropriate, wrinkles or bubbles may be caused in the vertically sealed portion or the laterally sealed portion. Even if the wrinkles or bubbles are as small as about few μm, there is a fear of causing a so-called slow leak that the bubbles are connected to each other or the plural bubbles and wrinkles are combined to form through-holes or pseudo through-holes changed to the though-holes with the lapse of time and the packaging material is leaked out through these through-holes or pseudo through-holes after one to few days. Since it is difficult to visually confirm such bubbles or wrinkles of few μm, the manufactured package bodies are temporarily stored for about 3 days, and then the good/bad package body is judged by the presence or absence of actual liquid leakage.

In this method, however, there are many problems that it is necessary to ensure a place of storing many package bodies, and the package body cannot be shipped immediately after the manufacture, and surrounding package bodies are contaminated when the liquid leakage is caused, and so on. Furthermore, the package bodies are frequently shipped at a state of connecting the plural bodies to each other through the laterally sealed portions (body-connected state). In the latter case, even if a poor sealed portion is existent in the laterally sealed portions between the package bodies, there is caused no liquid leakage up to the cutting to individual package bodies in the shipping site, so that the possibility of the slow leak cannot be judged by detecting the poor sealed portion before shipping.

The slow leak from the package body is mostly generated from the laterally sealed portion and a position of crossing the laterally sealed portion with the vertically sealed portion. As a first cause, when the elongated packaging film is folded in the widthwise direction and the side edges thereof are vertically sealed in a cylindrical form and then the packaging material is filled in the cylindrical packaging film, vertical wrinkles are easily generated by the deformation of the packaging film due to the weight of the packaging material. Especially, when the side sealing portion as a long side of the package body is the laterally sealed portion as disclosed in Patent Document 3, the occurrence of vertical wrinkles becomes remarkable. When lateral sealing is conducted at this state, through-type wrinkles passing through the sealed portion are generated in the laterally sealed portion and a position of crossing the laterally sealed portion with the vertically sealed portion, and the liquid leakage is caused through the through-type wrinkles.

As a second cause, the laterally sealed portion is formed by liquid-in seal filling wherein heat sealing is conducted by a pair of lateral sealing rolls while pushing out the liquid packaging material. In the liquid-in seal filling, variation is liable to be caused in the heat sealing in accordance with the temperature or kind of the packaging material and the like and poor heat sealing is liable to be caused.

Further, the packaging material is inevitably interposed in the laterally sealed portion, and a part of the packaging material is retained and easily bitten therein. Particularly, when the packaging material is a gas-liquid mixed phase fluid comprised of a liquid material and a gas such as nitrogen gas or the like filled therein, the possibility of biting the gas into the laterally sealed portion becomes higher, and the liquid material bitten in the laterally sealed portion may be released from a pressure of the lateral sealing rolls and expanded (200-600 times) to form bubbles and these bubbles are penetrated into the laterally sealed portion. When the plural bubbles are continuously formed so as to pass through the laterally sealed portion, poor sealing is generated leading to the liquid leakage immediately, and also there is a possibility that the slow leak is caused in accordance with the state of the bubbles and a relationship to the wrinkles.

The bubbles generated in the laterally sealed portion are at a bubbling state within a period that the laterally sealed portion is at a high temperature state just after the lateral sealing rolls, but they are cooled during the movement to the downstream side to bring about constriction and disappearance. Even if large bubbles immediately leading to the liquid leakage are existent, they may not be confirmed.

The invention is to solve the above problems and provide a system for checking a package body with an image capable of automatically judging a good or bad manufactured package body and automatically performing changes of production conditions in a filling and packaging machine.

Solution for Task

The inventors have mage various studies for achieving the above object, and as a result the invention having the following construction has been accomplished.

That is, the invention is a system for checking a package body made from a plastic film with an image, which comprises a filling and packaging machine, a system for judging image data, a storage device and a system for analyzing image date, wherein the system for judging image data comprises an imaging device for shooting a package body manufactured by the filling and packaging machine, a storage unit for storing a judgement condition on a good or bad package body, a judgement unit for judging the good or bad package body from image data of the package body imaged by the imaging device, and an image data transmission unit for transmitting the image data and/or information relating to the image data to the storage unit together with a judgement result of the judgement unit and production conditions of the filling and packaging machine through a communication means; and the system for analyzing image data comprises an image data acquisition unit for acquiring image data of bad result judged by the judgement unit and/or information relating to such image data from the storage device, an arithmetic processing unit comprised of an analysis unit for analyzing bad cause and new production conditions for solving the bad cause from the image data and/or information relating to the image data acquired from the image data acquisition unit based on previous image data stored in the storage device or information relating to such image data and the production conditions of the filling and packaging machine associated therewith and a judgement condition correcting unit for correcting the judgement condition when the judgement of the judgement unit is considered to be inaccurate based on preservation and observation results of the package body judged as a bad product in the judgement unit, and a transmission unit for transmitting the new production conditions obtained in the analysis unit to the filling and packaging machine and transmitting the new judgement condition obtained in the judgement condition correcting unit to the storage unit through communication means.

In the invention, it is a preferable solution means that the judgement unit is provided with a classification unit for classifying the image data and/or information relating to the image data every a given category, and the image data transmission unit is constructed so as to transmit image data belonging to each of the categories and/or information number relating to such image data to the storage device associated with the present production conditions of the filling and packaging machine and the judgement result of the judgement unit.

Effect of the Invention

According to the system for checking the package body with the image according to the invention, the good or bad manufactured package bodies are discriminated automatically, while the production conditions of the filling and packaging machine are changed automatically, so that a time from operation stop associated with the occurrence of bad product to operation restart can be shortened.

According to the system for checking the package body with the image according to the invention, the good or bad manufactured package bodies are judged with the image data, so that small defects not observed visually can be detected. Particularly, small wrinkles or bubbles of about few μm generated on the heat-sealed portion, which are not confirmed by the conventionally visual sorting, can be detected, so that whether or not such wrinkles or the like are a cause of the slow leak can be judged just after the manufacture of the package bodies. Since online detection can be performed so as not to require a time required for the detection of the slow leak (waiting time), the time, place and cost required for the check of the liquid leakage can be reduced.

Furthermore, according to the system for checking the package body with the image according to the invention, the previous image data or feature data extracted from such image data can be patterned and utilized in accordance with place and size of defects and production conditions (type and pitch of package body, operation conditions of filling and packaging machine and so on) as a judging condition used in the judgement on the good or bad package body. Moreover, the judgement condition is not limited by the image data and the feature data.

BRIEF DESCRIPTION OF THE DRAWINGS

FIG. 4(a) is an enlarged schematic view showing a part of first lateral sealing rolls in the filling and packaging machine of FIG. 2 and FIG. 4(b) is an enlarged schematic view of a laterally sealed portion.

EMBODIMENTS FOR CARRYING OUT THE INVENTION

The system for checking with an image according to the invention will be described with reference to the drawings below.

Figure 1:
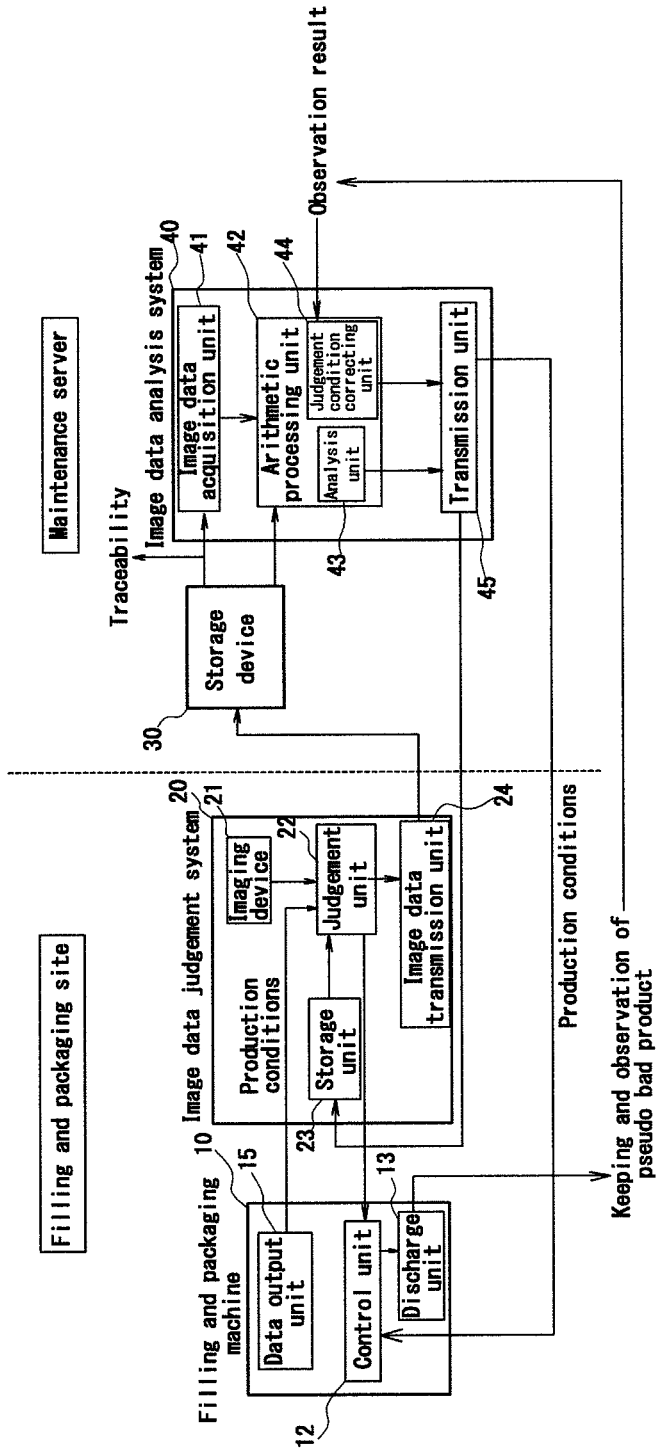
FIG. 1 is a block diagram showing an embodiment of the system for checking with the image according to the invention.

FIG. 1 is a block diagram showing an embodiment of the system for checking with the image according to the invention.

As shown in FIG. 1, the system for checking with the image 1 according to an embodiment of the invention comprises a filling and packaging machine 10 for manufacturing a filled package body as an inspection object, an image data judgement system 20 for judging a good or bad package body from image data of package bodies manufactured by the filling and packaging machine 10, a storage device 30 storing image data and the like transmitted from the filling and packaging machine 10, and an image data analysis system 40 for analyzing bad cause from image data and the like of the bad product stored in the storage device 30. The filling and packaging machine 10, the image data judgement system 20, the storage device 30 and the image data analysis system 40 are connected to each other through communication means such as LAN, the Internet and so on.

As the filling and packaging machine 10 may be included various types such as a vertical type filling and packaging machine as disclosed in Patent Documents 1 and 2, a lateral type filling and packaging machine, multiple filling and packaging machine and so on. As a typical example is explained a vertical type filling and packaging machine shown in FIG. 2 below. In the filling and packaging machine 10, a single elongated packaging film F continuously unreeled from a film roll R is continuously run from top down, during which the packaging film F is folded in the widthwise direction so as to face sealant layers to each other while guiding with a guide rod 100. In the figure, both side portions located at the left end portions of the packaging film F are superimposed to each other and the superimposed side portions are continuously pressed and heated by a vertical sealing mechanism 101 comprised of a pair of vertical sealing rolls in a longitudinal direction (vertical direction) of the packaging film F to form a vertical sealed portion 102, whereby the packaging film is rendered into a cylindrical form. Then, a packaging material M supplied from a tank not shown through a pump and a feed path not shown is filled into an inside of the cylindrically formed packaging film F continuously or intermittently at a given quantity through a filling nozzle 103 passing between the pair of vertical sealing rolls from top down, while the cylindrically formed packaging film F' is fused at a given interval in the longitudinal direction by heating and pressing over a full width through a first lateral sealing mechanism 104 comprised of a pair of lateral sealing rolls to intermittently form laterally sealed portions 105. Thereafter, the sealing of the laterally sealed portion 105 is ensured by re-pressing with a second lateral sealing mechanism 106, whereby a great number of package bodies W are continuously formed at a connected state in the longitudinal direction of the packaging film F. Moreover, the package bodies W may be cut every one bag or plural bags by placing a cutting mechanism 107 at a downstream side of the second lateral sealing mechanism 106 as shown in the figure.

The image data judgement system 20 is constructed with a computer provided with CPU, memories and so on, which comprises an imaging device 21 for imaging a given inspection site of the package body W manufactured in the filling and packaging machine 10 and a judgement unit 22 for comparing an image data imaged by the imaging device 21 with a judging condition as a standard on the good or bad package body stored in a storage unit 23 to judge the good or bad package body W in such image data.

The imaging device 21 is a device for imaging the package bodies W continuously manufactured in the filling and packaging machine 10. For example, a CCD camera, an infrared camera, a CMOS cameral and the like can be used. The imaging device 21 is not particularly limited as far as it can detect wrinkles, bruises, bubbles and so on of about few μm generated in the vertically sealed portion 102 and laterally sealed portion 105.

The imaging device 21 may be placed in any position of the filling and packaging machine 10 as far as it can image the given inspection site of the package body W. Also, plural inspection sites can be imaged by using a plurality of imaging devices 21.

Moreover, liquid leakage is apt to be generated due to poor sealing (occurrence of wrinkles or continuous bubbles) of the vertically sealed portion 102 and the laterally sealed portion 105 in the package body W, so that the inspection site is preferable to be at least the positions of the sealed portions 102, 105, particularly a position crossing the vertically sealed portion 102 with the laterally sealed portion 105. When the package body W is provided with a film-formed pouring nozzle as disclosed in JP-A-2005-59958, it is preferable that the attaching position or appearance of the pouring nozzle can be set as the inspection site to inspect shifting of the attaching position of the pouring nozzle, folding of the tip of the pouring nozzle and so on.

The judgement unit 22 has a function of judging the good or bad package body W in the image data acquired in the imaging device 21 by comparing such image data with the judging condition registered in the storage unit 23 of the image data judgement system 20 in consideration of production conditions acquired from the filling and packaging machine 10 (from a data output unit 15 thereof).

The judging condition is not particularly limited, but standard image data or standard feature data can be used, for example.

The standard image data are comprised of a standard image of a good product and/or a standard image of a bad product. As the standard image of the good product is included an image that a defect place is existent but is not a level of generating troubles in addition to an image existing no defect place. On the other hand, the standard image of the bad product means that the possibility of generating troubles such as liquid leakage or the like becomes high when defects similar to the pattern of defects such as wrinkles, bubbles and the like existing in the standard image are generated.

Moreover, the comparison with the standard image of the good product and the comparison with the standard image of the bad product may be performed at two stages. For example, after the judgement with the standard image of the good product, the package body W judged as a "bad product" can be further judged with the standard image of the bad product to improve judgement accuracy.

Also, the standard feature data means that defect place of wrinkles or bubbles causing the troubles such as liquid leakage or the like is extracted every feature as data from the past shot image data. For example, standard causing the trouble is previously stored as data every each item of number, size, length and position of wrinkles and size and position of bubbles in the storage unit 23.

In the judgement by the judgement unit 22, the feature data (kind, number, position and the like of the defect) are extracted from the image data shot by the imaging device 21. The feature data are compared with the standard feature data stored in the storage unit 23 to judge the good or bad package body W in the image data.

When the judgement results in the "bad product" in the judgement unit 22, a removal signal is output from the judgement unit 22 to a control unit 12 of the filling and packaging machine 10 and the judged package body W is discharged from a discharge unit 13 arranged in the filling and packaging machine 10 to another line, so that there is no fear of shipping the package body W suspected as a bad product. Moreover, it is preferable that bar cord or QR cord (registered trademark) is previously printed in the packaging film F for the package body W. The package body W as a bad product can be discharged accurately from the discharge unit 13 by checking such a package body W with the image data through the bar cord or the like.

Figure 3:
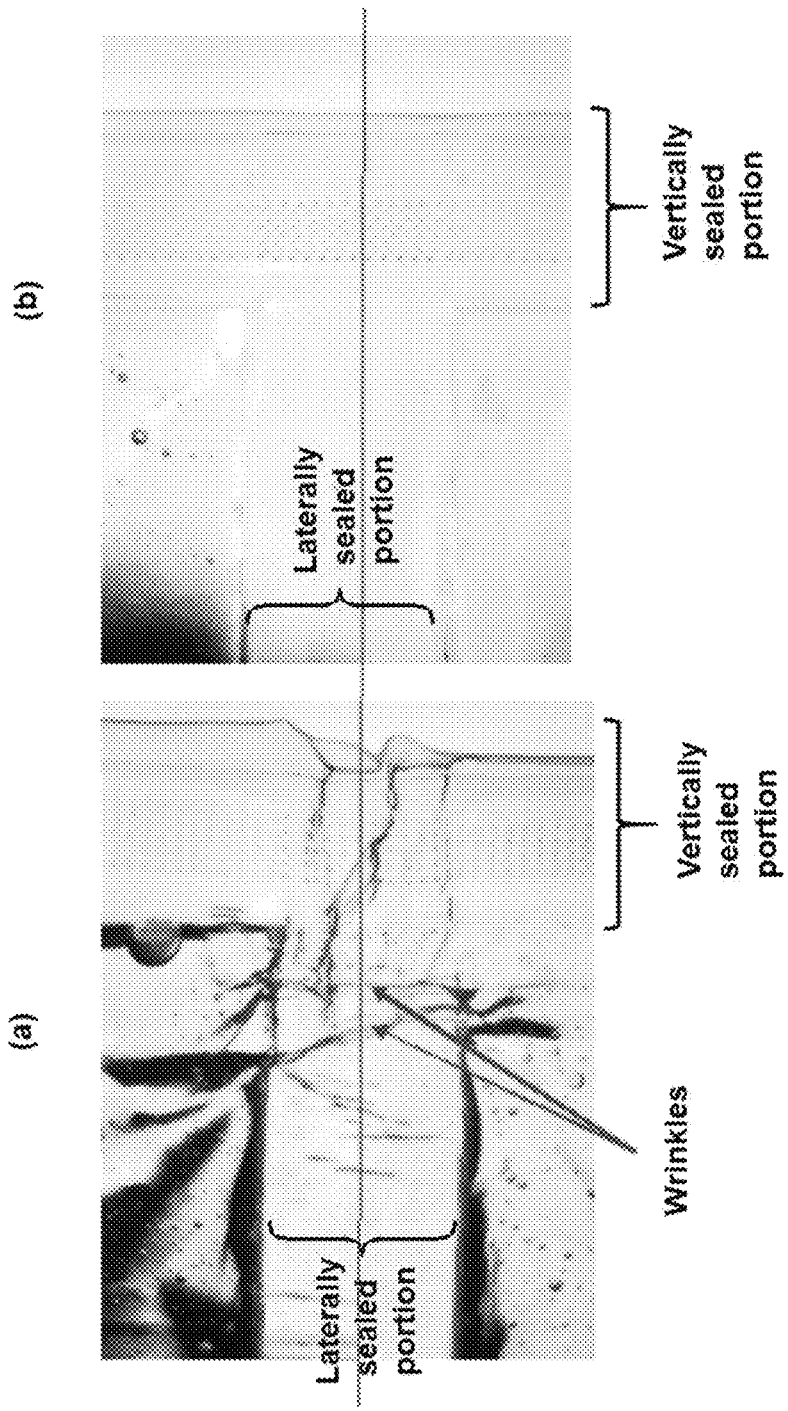
FIG. 3 is a diagram showing an example of image data (a) judged as a bad product and image data (b) judged as a good product in a judgement unit.
Figure 5:
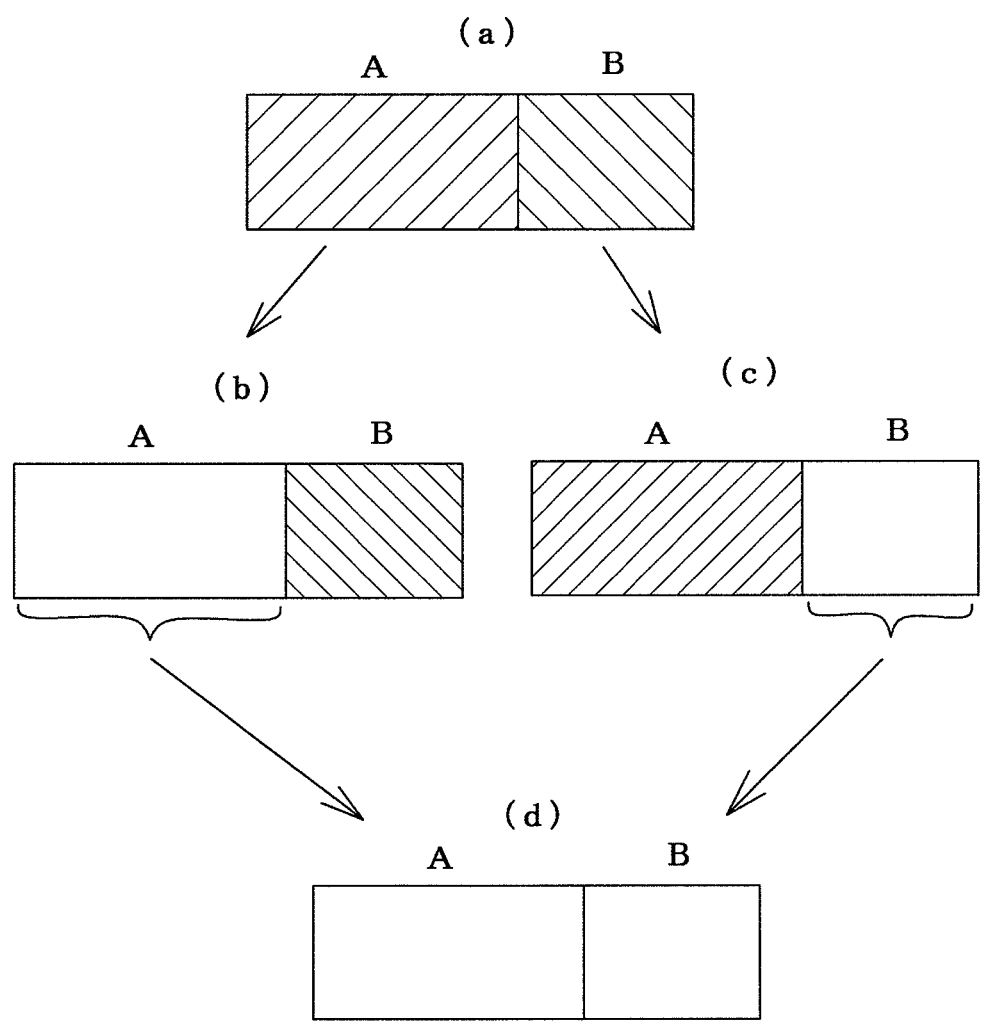
FIG. 5 is a schematic view of preparing a synthetic image from a shot image by varying an exposure in accordance with a print of a packaging film.

In FIG. 3 are shown an example of image data (a) judged as a "bad product" and image data (b) judged as a "good product" in the judgement unit 22. The image data are shot at a position crossing the vertically sealed portion 102 with the laterally sealed portion 105 in the package body W. In the image data (a) judged as the bad product, wrinkles passing in the longitudinal direction of the laterally sealed portion 105 are generated at positions shown by an arrow.

An example of the method for judging poor sealing of the laterally sealed portion 105 in the judgement unit 22 will be explained below.

Figure 2:
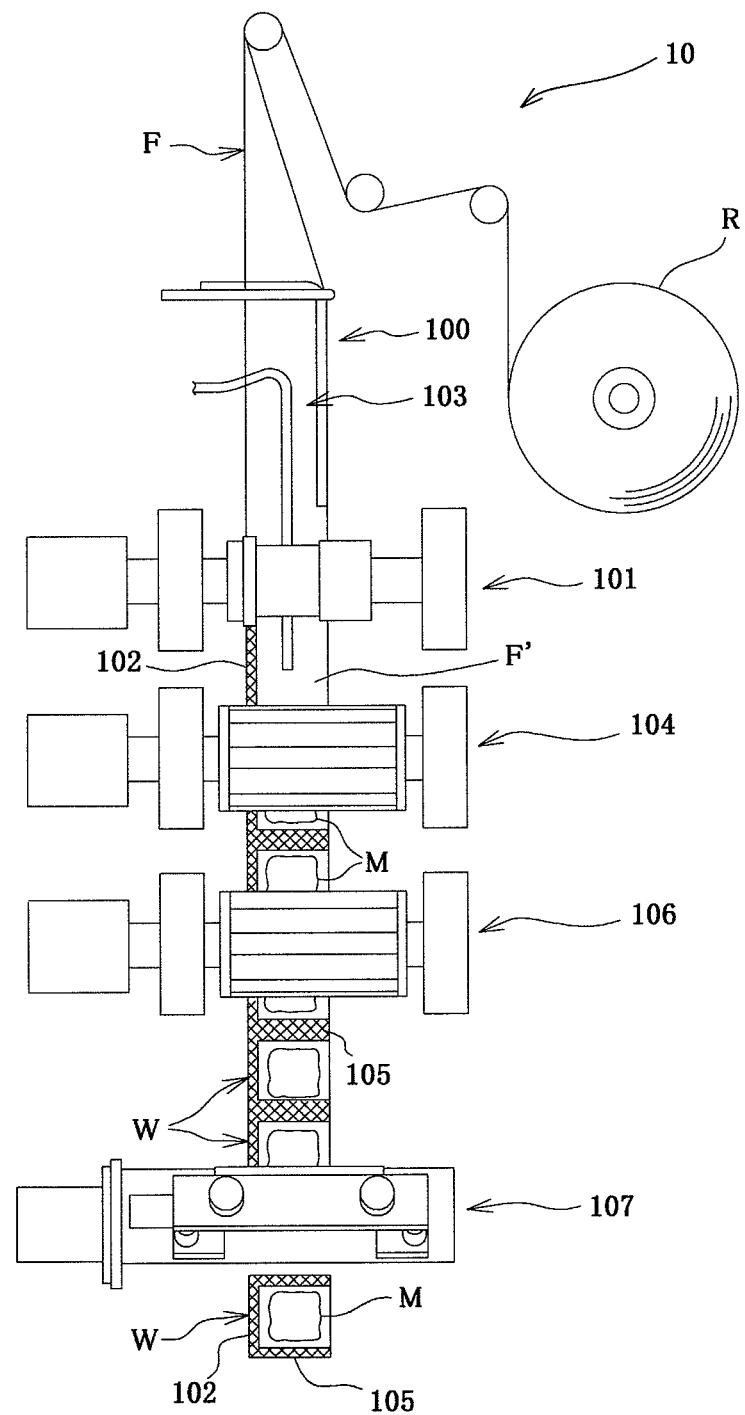
FIG. 2 is a schematic view showing a construction of a filling and packaging machine.

In FIG. 4(a) is shown an enlarged side view of a part of the first lateral sealing rolls 104 in the filling and packaging machine 10 of FIG. 2. As shown in FIG. 4(a), an imaging device 21 comprised of an infrared camera 21a facing to the package body W and an infrared ray irradiating device 21b opposite thereto and across the packaging film F is arranged at a downstream side of the first lateral sealing rolls 104 in the running direction of the packaging film F. As the infrared camera 21a, it is preferable to use a camera provided with a CCD sensor, a CMOS sensor or the like and having a sensitivity to near infrared ray with a wavelength of 700-1700 nm made of an infrared LED or the like irradiated from the infrared ray irradiating device 21b. When the packaging film F is shot by a visual-light camera, an interior of the laterally sealed portion 105 cannot be shot because the visual light is reflected on the surface of the packaging film F. On the other hand, the near infrared ray is transmissive to the packaging film F and is reflected at a non-sealed position of the bubbles or wrinkles generated in the laterally sealed portion 105 to uplift profile thereof, whereby a defect image can be shot photographically.

Moreover, the imaging device 21 comprised of the infrared camera 21a and the infrared ray irradiating device 21b is preferable to be disposed so as to shot the laterally sealed portions 105 intermittently formed by the first lateral sealing rolls 104 at a position that a length L of the packaging film F in the running direction is within 30 cm, preferably 20 cm from the first lateral sealing rolls 104, particularly a lateral heat sealing position of the first lateral sealing rolls 104 (a position of contacting heat sealing bars 104a arranged at equal intervals in the circumferential direction of the pair of first lateral sealing rolls 104 with each other).

When the laterally sealed portion 105 is shot just after the first lateral sealing rolls 104, particularly at a position within 30 cm from the first lateral sealing rolls 104, bubbles generated in the laterally sealed portion 105 can be shot at a bubbling state because the laterally sealed portion 105 is at a high temperature state by heating through the first lateral sealing rolls 104. Therefore, a state of connecting plural bubbles to each other or a state of communicating the bubbles with the wrinkles in the laterally sealed portion 105 can be detected from the shot image, so that it can be performed to judge whether or not they bring about poor sealed portion causing the slow leak. Moreover, when the shooting position is separated away by more than 30 cm from the first lateral sealing rolls 104 at the downstream side in the running direction of the packaging film F, the bubbles generated in the laterally sealed portion 105 are shrunk associated with the cooling of the laterally sealed portion 105, and particularly small bubbles of about few μm are disappeared completely. In this case, poor sealed portion causing the slow leak cannot be detected from the shot image and there is a fear that the slow leak cannot be detected just after the manufacture of the package bodies W.

In the heating of the packaging film F by the first lateral sealing rolls 104, the vertically sealed portion 102 is refused by heating together with the laterally sealed portion 105, and wrinkles may be generated. Even in this case, when the shooting by the infrared camera 21a is performed at a position within 30 cm from the laterally heat sealing position, bubbles generated in the laterally sealed portion 105 can be shot at a bubbling state, so that it can be performed to judge whether or not poor sealed portion is caused by communicating these bubbles with wrinkles generated at a position crossing the laterally sealed portion 105 with the vertically sealed portion 102.

From the image shot by the imaging device 21 (image signal) are extracted feature data relating to connection of wrinkles or bubbles, combination of wrinkles with bubbles and the like in the laterally sealed portion 105 (for example, length and position of wrinkles, size and position of bubbles, number of wrinkles and bubbles and so on) with an image processing unit made of a computer or the like, which are compared with standard feature data stored in the storage unit 23 (for example, standard image data, data on kind and feature of past generated defects every feature) in the judgement unit 22.

As shown in FIG. 4(b), feature data of the laterally sealed portion 105 in the shot image is extracted from through-holes (connecting in the filling space) or pseudo through-holes (connecting in the filling space with lapse of time) in a region 110 within 3.0 mm from a seal edge 108 at a filling space side of the packaging material in the vertically sealing direction (region shown by dashed-dotted line in FIG. 4(b), which is called as a "judging region 110" hereinafter), which are compared with the standard feature data stored in the storage unit 23 in the judgement unit 22, whereby the judgement of slow leak causing the liquid leakage from the package body W after a given lapse of time from the manufacture can be performed immediately after the manufacture of the package body W.

When the seal edge 108 located at the filling space side is continuously formed in the vertical sealing direction in form of a band having a length of 3.0 mm or at least 1.0 mm, the laterally sealed portion 105 can provide a sufficient sealing strength. That is, if the poor sealed portion such as fine bubbles or wrinkles is existent in the judging region 110, peeling of the laterally sealed portion 105 started from such a portion gradually proceeds over several hours to several days. When the laterally sealed portion 105 is cut at a cutting position 111 (a central position in the longitudinal direction of the laterally sealed portion 105), liquid leakage (slow leak) is caused from the cut end face.

In case of FIG. 4(b), a non-sealed portion 109a is made from a succession of bubbles but is located outside the judging region 110, so that it is judged to have no possibility of causing the slow leak. On the contrary, a non-sealed portion 109b is located in the portion of the seal edge 108 in the judging region 110, so that it is judged to have a possibility of causing the slow leak.

When a color, a pattern, letters and so on are printed on the packaging film F, if an aperture value of the infrared camera 21a is fitted into the printed portion, a non-printed portion becomes too bright. On the other hand, when the aperture value of the infrared camera 21a is fitted into the non-printed portion, the printed portion becomes too dark. In any case, the whole of the laterally sealed portion 105 cannot be shot.

Therefore, it is preferable to use a plurality of infrared cameras 21a having different exposures to cut out and synthesize (reconstruct) only an optimum portion (a portion clearly taking out the interior of the laterally sealed portion 105) from plural shot images of these infrared cameras 21a or from plural images obtained by adjusting definition and/or exposure from one image shot by the infrared camera 21a with an image processing unit. In this method, when a region A has a printed portion and a region B is made from a transparent film, an image (b) obtained by fitting exposure to the region A and an image (c) obtained by fitting exposure into the region B are prepared from one shot image (a) shot by the infrared camera 21a with the image processing unit, respectively, and then a portion of the region A is cut out from the image (b) and a portion of the region B is cut out from the image (c) and the cut out portions of the regions A and B are combined to form a synthesis image (d). Thus, the whole of the laterally sealed portion 105 can be shot clearly as a single image without obstructing by the printed layer in the packaging film F, so that the judgement of the slow leak can be performed by the same method as in the packaging film F having no printed layer.

The image data judged in the judgement unit 22 are transmitted from an image data transmission unit 24 to the storage device 30 together with the judged results and production conditions of the filling and packaging machine 10 and stored therein. Moreover, when the standard feature data are used as the judging condition, feature data extracted from the image data may be transmitted from the image data transmission unit 24 to the storage device 30 together with the image data or instead of the image data in the judgement by the judgement unit 22. Hereinafter, the combination of the image data and feature data extracted from the image data are called as "image data and so on".

The image data transmission unit 24 has a function of transmitting the image data and so on shot with the imaging device 21 to the storage device 30 through the Internet as a transmission means in association with information of existing production conditions in the filling and packaging machine 10 and the judging results of the judgement unit 22. Since the great number of package bodies W are manufactured, for example, at a speed of about 100,000 bodies per day, it may be set to transmit the image data every several minute or several hours as a whole.

The storage device 30 has a function of storing the image data and so on acquired in the image data judgement system 20 and information and so on of the production conditions and judging result associated with the image data and so on. Since the storage device 30 stores a great number of image data and so on transmitted, it is preferable to divide these data into plural directories or folders in association with patterns of defect place and production conditions (for example, kind of plastic film, kind, filling amount and pitch of packaging material and so on) for storing.

Particularly, the image data and so on stored in the storage device 30 are utilized in the following arithmetic processing unit 42 as the stored information data in the analysis on the cause generating bad product, so that it is preferable to minutely classify and pattern these data based on the form of defects, production conditions and the like in the storing image with the storage device 30. Thus, the relation between the form of the defect and the production conditions is made clear, and hence the analysis operation in the arithmetic processing unit 42 can be performed rapidly and in a high accuracy.

As to image data and so on of the bad product judged in the judgement unit 22 among the image data and so on stored in the storage device 30 are examined the cause generating the defect and countermeasure therefor in an image data analyzing system 40.

The image data analyzing system 40 is constructed with a computer provided with CPU, memories and the like and comprises an image data acquisition unit 41 and an arithmetic processing unit 42. The image data acquisition unit 41 has a function of acquiring image data and so on judged as a "bad product" in the judgement unit 22 among the image data and so on newly registered in the storage device 30. On the other hand, image data and so on judged as a "good product" can be utilized as a traceability (production history) in the production management of package bodies.

The arithmetic processing unit 42 is provided with an analysis unit 43 for analyzing the cause generating the defect by comparing the image data and so on of "bad product" acquired from the image data acquisition unit 41 with the information data stored in the storage device 30 (past image data and feature data). Concretely, the cause is identified in the analysis unit 43, for example, by matching the image data and so on judged as the bad product with the great number of past information stored in the storage device 30 (image data, feature data, production conditions and so on). In the analysis unit 43, new production conditions of the filling and packaging machine 10 for solving the occurrence of the defect (for example, tension of the packaging film F, temperature and speed of the vertically sealing mechanism 101, temperature and speed of the first laterally sealing mechanism 104, up and down of production rate and so on) can be calculated from the analyzed results based on the past image data and so on and production conditions associated therewith.

The new production conditions calculated in the analysis unit 43 are input to the control unit 12 of the filling and packaging machine 10 through a transmission unit 45 to automatically set and change production conditions of the filling and packaging machine 10 (for example, degree of tension in the packaging film F, change in temperature and speed of the vertically sealing mechanism 101, change in temperature and speed of the first laterally sealing mechanism 104, up and down of production rate and so on). Therefore, a time from stop of operation associated with the generation of troubles to restart of operation can be shortened or the troubles can be solved without stopping the operation.

Moreover, the package body W judged as a bad product in the judgement unit 22 and removed from the production line through the discharge unit 13 (pseudo bad product) is kept and observed for several days to confirm the occurrence of troubles such as liquid leakage and the like. The result is input to a judgement condition correcting unit 44. When the liquid leakage is not caused regardless of judgement as the bad product in the judgement unit 22, the judgement condition correcting unit 44 outputs instructions for changing the standard image data or standard feature data as a judgement condition (instruction for removing or correcting image or feature data based on the erroneous judgement) to a transmission unit 45. By the transmission unit 45 are transmitted such instructions to a storage unit 23 of the image data judgement system 20 through the Internet as a transmission means to perform change of the stored standard image data or standard feature data (removal or correction of image or feature data based on the erroneous judgement). Moreover, this procedure is repeated when the erroneous judgement is caused in the judgement unit 22, whereby the judgement accuracy in the judgement unit 22 can be improved to reduce a frequency of picking a good product as a bad product.

Figure 6:
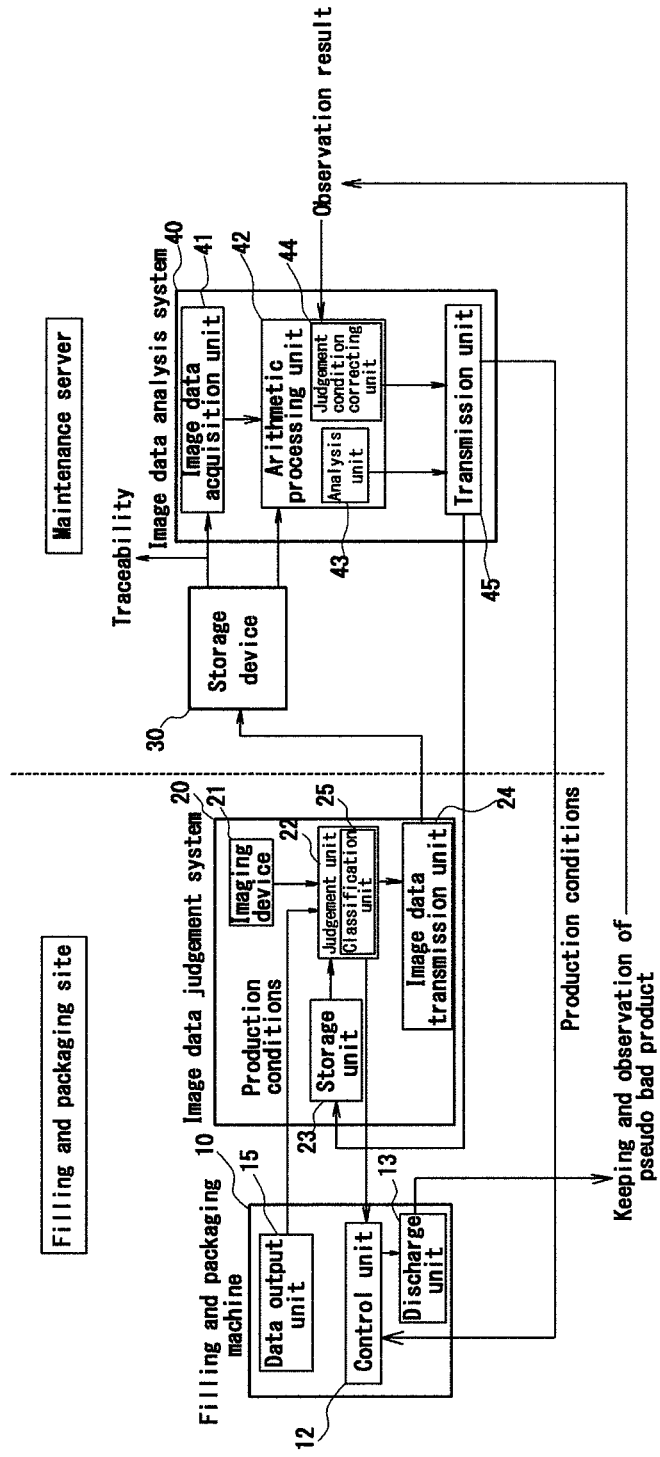
FIG. 6 is a block diagram showing another embodiment of the system for checking with the image according to the invention.

Another embodiment of the system for checking with the image according to the invention will be described with reference to FIG. 6 below. In this embodiment, the judgement unit 22 is provided with a classification unit 25 for classifying the image data and so on into given categories based on information extracted from such image data (for example, position, size and number of wrinkles or bubbles and the like) instead of transmitting the image data and so on shot by the imaging device 21 from the image data transmission unit 24 to the storage device 30 as they are. The image data transmission unit 24 is constructed so as to transmit classification conditions of each category, number of image data belonging to each category, present production conditions of the filling and packaging machine 10, results judged in the judgement unit 22 and so on in association with each other to the storage device 30. According to this construction, information quantity can be made smaller massively as compared to a case that the image data shot imaging device 21 are transmitted to the storage device 30 as they are, so that transmission load can be reduced and it is possible to perform transmission in an almost real-time way.

DESCRIPTION OF REFERENCE SYMBOLS

10 filling and packaging machine
12 control unit
13 discharge unit
15 data output unit
20 image data judgement system
21 imaging device
21*a* infrared camera
21*b* infrared ray irradiating device
22 judgement unit
23 storage unit
24 image data transmission unit
25 classification unit
30 storage device
40 image data analysis system
41 image data acquisition unit
42 arithmetic processing unit
43 analysis unit
44 judgement condition correcting unit
45 transmission unit
100 guide rod
101 vertically sealing mechanism
102 vertically sealed portion
103 filling nozzle
104 first laterally sealing mechanism
105 laterally sealed portion
106 second laterally sealing mechanism
107 cutting mechanism
108 seal edge
109*a*, 109*b* non-sealed portion
110 judgement region
111 cutting position

The invention claimed is:

1. A system for checking a package body made from a plastic film with an image, comprising:

a filling and packaging machine for manufacturing a package body;
a system for judging image data;
a storage device; and
a system for analyzing image data,
wherein the system for judging image data comprises:
an imaging device for taking an image of the package body manufactured by the filling and packaging machine;
a memory for storing a judgement condition on a non-defective or defective package body; and
a processor configured to function as:
a judgement unit for judging whether the package body is non-defective or defective based image data of the package body imaged by the imaging device, and
an image data transmission unit for transmitting the image data and/or information relating to the image data to the memory together with a judgement result of the judgement unit and production conditions of the filling and packaging machine; and
wherein the system for analyzing image data comprises a CPU configured to function as:
an image data acquisition unit for acquiring image data relating to a result that the package body is defective as judged by the judgement unit and/or information relating to such image data from the storage device;
an arithmetic processing unit comprised of an analysis unit for analyzing cause that generated the result that the package body is defective and new production conditions for solving the cause by comparing the image data and/or information relating to the image data acquired from the image data acquisition unit with previous image data stored in the storage device or information relating to such image data and the production conditions of the filling and packaging machine associated therewith;
a judgement condition correcting unit for outputting an instruction for correcting the judgement condition when the judgement of the judgement unit is considered to be erroneous based on results obtained by observing the package body for a predefined amount of time that has been erroneously judged as being a defective product, wherein the instruction for correcting the judgment condition includes instruction for removing or correcting image or feature data based on the erroneous judgement and
a transmission unit for transmitting the new production conditions obtained in the analysis unit to the filling and packaging machine and transmitting the instruction to the storage unit.

2. The system according to claim 1,
wherein the judgement unit includes a classification unit for classifying the image data and/or information relating to the image data every a given category, and
wherein the image data transmission unit is configured to transmit image data belonging to each of the categories and/or information number relating to such image data to the storage device associated with present production conditions of the filling and packaging machine and the judgement result of the judgement unit.

* * * * *

UNITED STATES PATENT AND TRADEMARK OFFICE
CERTIFICATE OF CORRECTION

| | | |
|---|---|---|
| PATENT NO. | : 10,839,501 B2 | Page 1 of 1 |
| APPLICATION NO. | : 16/310283 | |
| DATED | : November 17, 2020 | |
| INVENTOR(S) | : K. Futase | |

It is certified that error appears in the above-identified patent and that said Letters Patent is hereby corrected as shown below:

In the Claims

Column 12, Line 14 Claim 1, change "based image" to -- based on image --.

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*